(12) United States Patent
Muldoon

(10) Patent No.: US 10,710,202 B2
(45) Date of Patent: Jul. 14, 2020

(54) ENGINE COMPONENT STACK AND ASSEMBLY THEREOF

(71) Applicant: United Technologies Corporation, Farmington, CT (US)

(72) Inventor: Marc J. Muldoon, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 233 days.

(21) Appl. No.: 15/652,712

(22) Filed: Jul. 18, 2017

(65) Prior Publication Data

US 2019/0022804 A1  Jan. 24, 2019

(51) Int. Cl.
*B23P 11/02* (2006.01)
*F16C 35/063* (2006.01)
*F01D 25/16* (2006.01)
*F01D 25/28* (2006.01)
*F01D 25/12* (2006.01)
*F16C 43/00* (2006.01)
*F16C 35/06* (2006.01)

(52) U.S. Cl.
CPC .......... *B23P 11/025* (2013.01); *F01D 25/125* (2013.01); *F01D 25/16* (2013.01); *F01D 25/162* (2013.01); *F01D 25/28* (2013.01); *F16C 35/063* (2013.01); *F16C 43/00* (2013.01); *F05D 2220/32* (2013.01); *F05D 2240/50* (2013.01); *F05D 2240/52* (2013.01); *F05D 2240/54* (2013.01); *F16C 35/06* (2013.01); *F16C 2226/14* (2013.01); *F16C 2360/23* (2013.01)

(58) Field of Classification Search
CPC ...... F01D 25/125; F01D 25/16; F01D 25/162; F01D 25/28; Y10T 29/49663; Y10T 29/49826
See application file for complete search history.

(56) References Cited

U.S. PATENT DOCUMENTS 3,645,593 A    2/1972 Irwin
3,725,994 A *  4/1973 Wechsler ................ B21B 28/02
                                                  29/447
4,968,158 A   11/1990 Atkinson et al.
(Continued)

FOREIGN PATENT DOCUMENTS

DE         2744918 A1   4/1979
DE    102010053404 A1   6/2012
(Continued)

OTHER PUBLICATIONS

English translation EP 2357061 A2 (Year: 2011).*
EP search report for EP18184235.2 dated Oct. 24, 2018.

*Primary Examiner* — Jason L Vaughan
*Assistant Examiner* — Amanda Kreiling
(74) *Attorney, Agent, or Firm* — Getz Balich LLC

(57) ABSTRACT

Aspects of the disclosure are directed to components of an engine and one or more methods for assembling the components. A first component is positioned adjacent to a second component such that a first surface of the first component abuts the second component. A cooling plate is coupled to the first component such that a first surface of the cooling plate abuts a second surface of the first component. A loading ram is coupled to the cooling plate such that a second surface of the cooling plate abuts the loading ram.

16 Claims, 7 Drawing Sheets

(56) References Cited

U.S. PATENT DOCUMENTS

| | | |
|---|---|---|
| 8,469,597 B2 | 6/2013 | Smith et al. |
| 8,876,447 B2 * | 11/2014 | Allehaux ............... B23Q 11/10 279/20 |
| 2008/0056634 A1 | 3/2008 | Hewitt et al. |
| 2015/0026979 A1 | 1/2015 | Muller |
| 2016/0258488 A1 | 9/2016 | Lin et al. |

FOREIGN PATENT DOCUMENTS

| | | | |
|---|---|---|---|
| EP | 2357061 A2 * | 8/2011 | ........... B23P 11/025 |
| EP | 2357061 A2 | 8/2011 | |

* cited by examiner

ENGINE COMPONENT STACK AND ASSEMBLY THEREOF

BACKGROUND

Gas turbine engines, such as those which power aircraft and industrial equipment, employ a compressor to compress air that is drawn into the engine and a turbine to capture energy associated with the combustion of a fuel-air mixture. Bearings are used to support the rotational hardware of an engine. For example, bearings are used to support a shaft of the engine.

During assembly of an engine, bearing compartment components typically have an interference fit with a shaft. In order to facilitate installation of the bearing, the bearing is heated to at least a threshold temperature that causes the bearing to grow larger than (a diameter of) the shaft so that the bearing can slide over the shaft and into a designated position. This process is repeated for other components that have an interference fit; examples of such other components include seals, spacers, oil scoops, etc. FIG. 2 illustrates a system 200 that includes a seal 206, a first bearing 212a, a spacer 218, and a second bearing 212b arranged relative to (e.g., radially outward from) a shaft 224. The first bearing 212a includes a first roller/rolling element 213a and a first race 214a and the second bearing 212b includes a second roller/rolling element 213b and a second race 214b.

During assembly, the components 206-218 are installed on the shaft 224 in the order just mentioned (e.g., left-to-right in FIG. 2). For example, the seal 206 is installed first, then the first bearing 212a, then the spacer 218, then the second bearing 212b. The arrangement/positioning of components (e.g., the components 206-218) adjacent to one another about a shaft (e.g., the shaft 224) may be referred to as a "stack" herein.

During assembly, each of the components 206-218 is heated as described above and then, in turn, pressed against the prior component in the stack (e.g., the component that is to the left in FIG. 2) via engagement of a loading ram 240. Regarding the first/left-most component in the stack (e.g., the seal 206 in FIG. 2), that component may be pressed against a lip/shoulder 224a of the shaft 224 via the loading ram 240. In this respect, the shoulder 224a may form a part of the stack. The loading ram 240 is frequently implemented as a hydraulically actuated member.

While the loading ram 240 is engaged/applied to the component being added/assembled to the stack, the component (e.g., the second bearing 212b as shown in the example of FIG. 2) that the loading ram 240 interfaces to is allowed to cool to a threshold temperature. Once this threshold temperature is reached, the loading ram 240 is disengaged/removed from the stack. Maintaining the loading ram 240 in an engaged state during component cooling ensures that the component (e.g., the second bearing 212b in FIG. 2) remains properly seated and gaps do not form between components in the stack.

Allowing each of the components in the stack to cool represents a cost in terms of the time it takes to assemble the engine. In some instances a component may take on the order of one hour to cool to the threshold temperature. In order to mitigate/reduce this time/cost, air may be blown onto a component to accelerate the rate at which the component cools. The use of blown air may have a tendency to introduce debris to the component. As such, the practice of using blown air may not be acceptable. This is particularly true in the context of the bearings 212a and 212b, due to the high cleanliness standards that are frequently associated therewith.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method for assembling components of an engine, comprising: positioning a first component adjacent to a second component such that a first surface of the first component abuts the second component, coupling a cooling plate to the first component such that a first surface of the cooling plate abuts a second surface of the first component, and coupling a loading ram to the cooling plate such that a second surface of the cooling plate abuts the loading ram. In some embodiments, the method further comprises engaging the loading ram subsequent to coupling the loading ram to the cooling plate. In some embodiments, the method further comprises engaging a cooling system subsequent to engaging the loading ram, where the cooling system includes the cooling plate. In some embodiments; the cooling system includes a fluid source coupled to the cooling plate, and the cooling plate includes an input port, an output port, and a passage disposed between the input port and the output port, and the method further comprises receiving, by the input port, a fluid from the fluid source, and conveying, via the passage, the fluid from the input port to the output port. In some embodiments, the fluid includes compressed air. In some embodiments, the cooling system includes a fluid source and a nozzle, and the method further comprises receiving, by the nozzle, a first fluid from the fluid source, and transmitting, by the nozzle, a second fluid to the cooling plate. In some embodiments, the nozzle includes a vortex tube with an input port and an output port, and the method further comprises receiving, by the input port, the first fluid from the fluid source, and transmitting, by the output port, the second fluid to the cooling plate. In some embodiments, the first fluid has a first temperature and the second fluid has a second temperature that is less than the first temperature. In some embodiments, the method further comprises heating the first component prior to positioning the first component adjacent to the second component. In some embodiments, the method further comprises determining that a temperature of the first component is less than a threshold subsequent to coupling the cooling plate to the first component, and decoupling the cooling plate from the first component based on determining that the temperature of the first component is less than the threshold. In some embodiments, the threshold is approximately equal to a temperature of a room where the first component is located. In some embodiments, the method further comprises disengaging a cooling system based on determining that the temperature of the first component is less than the threshold, where the cooling system includes the cooling plate. In some embodiments, the method further comprises measuring the temperature of the first component to determine that the temperature of the first component is less than the threshold. In some embodiments, the method further comprises decoupling the loading ram from the cooling plate subsequent to coupling the loading ram to the cooling plate, and decoupling the cooling plate from the first component subsequent to decoupling the loading ram from the cooling plate. In some embodiments, the method further comprises subsequent to decoupling the cooling plate from the first component, positioning a third component adjacent to the first component such that a first surface of the third component abuts the second surface of the first component, subsequent to positioning the third component adjacent to the first component, coupling the cooling plate to the third component such that the first surface of the cooling plate abuts a second surface of the third component, and subsequent to coupling the cooling plate to the third component, coupling the loading ram to the cooling plate such that the second surface of the cooling plate abuts the loading ram. In some embodiments, the first component is a bearing that includes a roller and a race, and the method further comprises abutting the race to a shaft of the engine, where the second surface of the first component is a surface of the race. In some embodiments, the second component is one of a seal, a spacer, or a shoulder of a shaft of the engine, and where the loading ram is hydraulically actuated. In some embodiments, the method further comprises subsequent to coupling the cooling plate to the first component, applying a cooling fluid directly to the first component.

Aspects of the disclosure are directed to a system comprising: a first component, a second component positioned adjacent to the first component such that a first surface of the second component abuts the first component, a cooling plate positioned adjacent to the second component such that a first surface of the cooling plate abuts a second surface of the second component, and a loading ram coupled to a second surface of the cooling plate.

Aspects of the disclosure are directed to a bearing stacking device, comprising: a housing configured to surround a shaft, where the housing includes a first surface and a second surface, where the first surface is configured to abut a component disposed on the shaft, a thermal transfer apparatus configured to transfer thermal energy to or from the component, and a loading ram configured to position the first surface of the housing in axial relation to the component.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
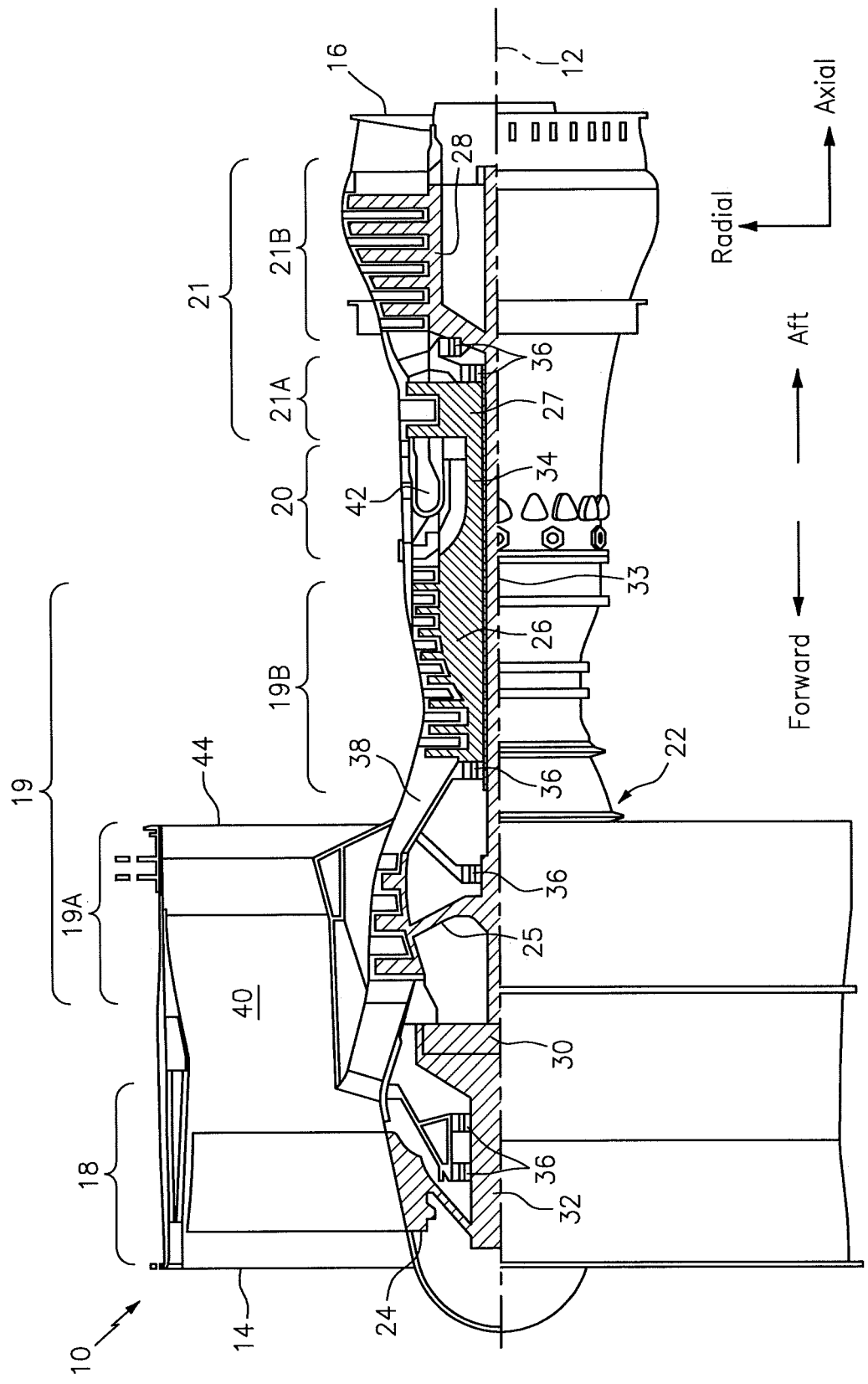
FIG. 1 is a side cutaway illustration of a geared turbine engine.
Figure 2:
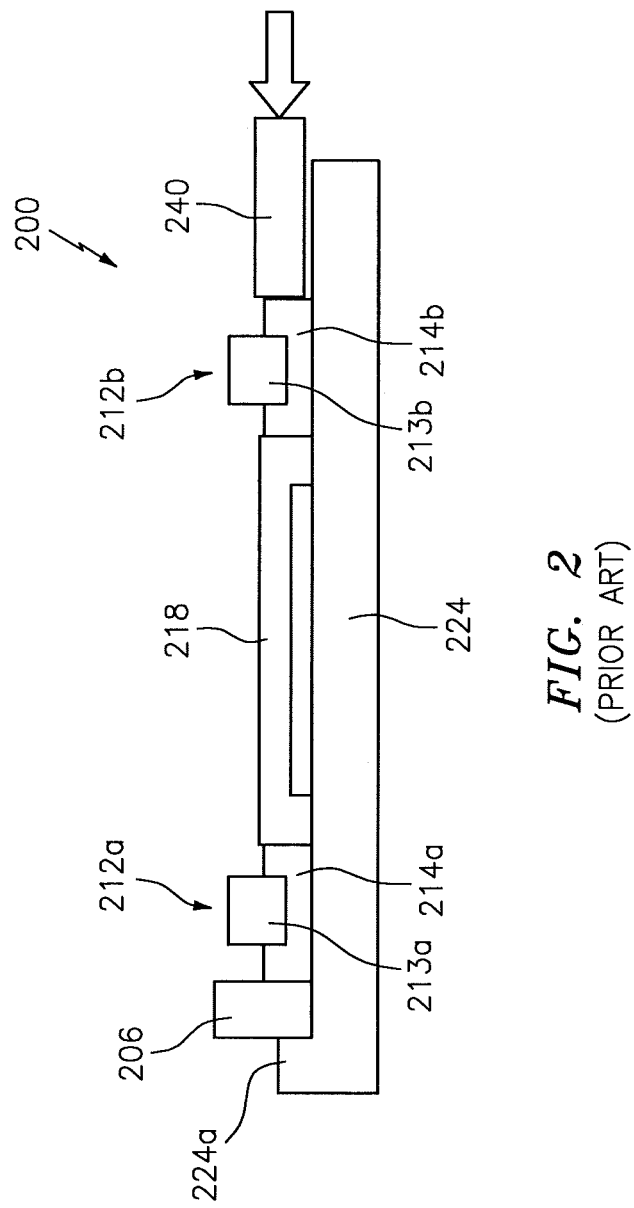
FIG. 2 illustrates a block diagram of a bearing compartment system in accordance with the prior art.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3:
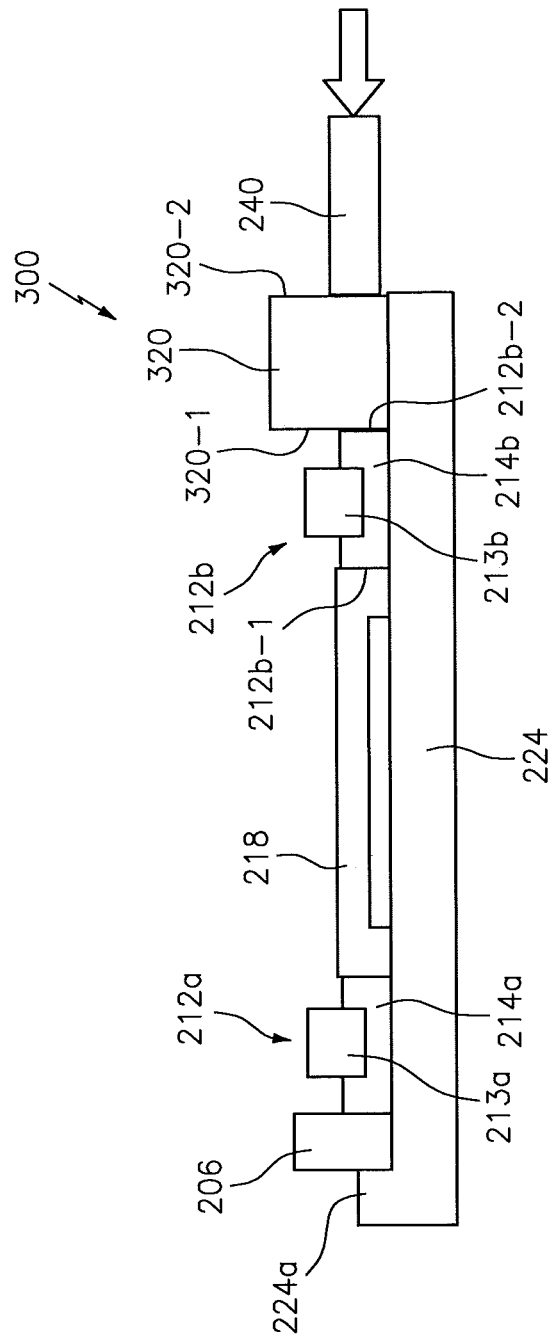
FIG. 3 illustrates a block diagram of a bearing compartment system in accordance with aspects of this disclosure.

Referring to FIG. 3, a system 300 is shown. The system 300 may be associated with a bearing compartment of an engine. For example, the bearings 212a and 212b may correspond to the bearings 36 of the engine 10 described above.

The system 300 may include a plate 320 that may be used during assembly of the system 300. For example, in FIG. 3 the plate 320 is shown as being disposed between the loading ram 240 and a component (illustratively, the second bearing 212b) that is being assembled into a stack. The plate 320 may function as a heat sink by withdrawing heat from the component that is being assembled into the stack. In this respect, the plate 320 may be referred to as a cooling plate. While the loading ram 240 is shown separately from the plate 320, in some embodiments the loading ram 240 may be integrated with the plate 320.

The plate 320 may be made of one or more materials. For example, in some embodiments steel may be used. Steel may provide sufficient strength relative to the loads that may be encountered during assembly from, e.g., the loading ram 240, as described further below while still providing a high degree of thermal conductivity. In embodiments where load tolerances are not as much of a consideration, aluminum may be used to enhance thermal conduction (relative to steel). In some embodiments, one or more metal alloys may be used in conjunction with the plate 320.

Figure 4:
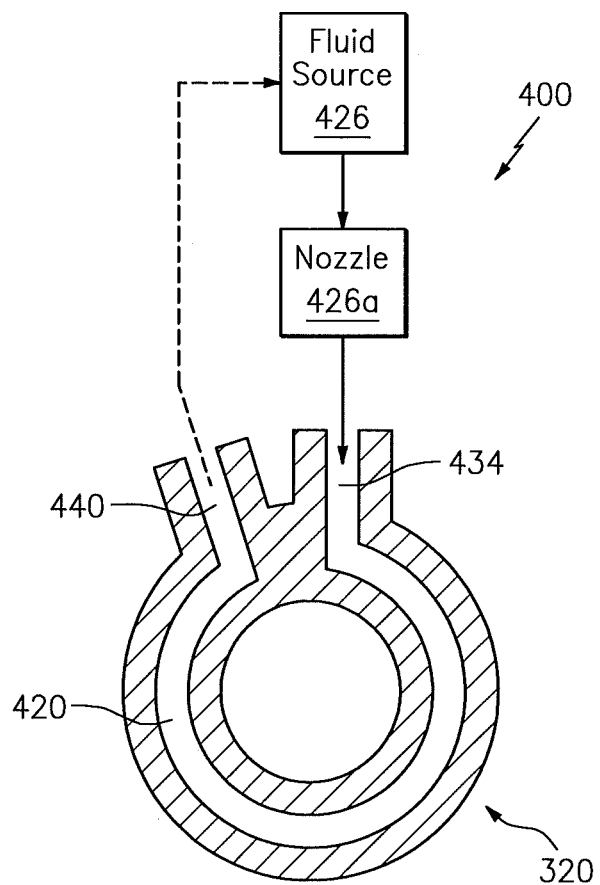
FIG. 4 illustrates a cooling system in accordance with aspects of this disclosure.

Referring briefly to FIG. 4, an illustrative embodiment of a cooling system 400 incorporating the plate 320 of FIG. 3 is shown. The plate 320 may include one or more channels/passages 420 that may be used to convey a fluid. The fluid may be introduced to the plate 320 from a source 426 at one or more input ports (e.g., port 434). The fluid may be exhausted from the plate 320 via one or more output ports (e.g., port 440).

In some embodiments, the fluid that exits the output port 440 may be exhausted to an external, ambient environment. In some embodiments, the fluid that exits the output port 440 may be returned to the source 426 (as reflected by the dashed line emanating from the output port 440 towards the source 426 in FIG. 4) in order to form a closed-loop circuit. Stated slightly differently, the fluid may be recycled/reused in some embodiments. The fluid may be conditioned/processed prior to reuse.

The fluid that is provided by the source 426 may include air, such as for example compressed air that is typically found in a workshop or on an assembly floor. Other types of fluids may be used, such as for example a refrigerant, water, oil, etc.

In some embodiments, a nozzle may be used. For example, FIG. 4 illustrates a nozzle 426a disposed between the source 426 and the port 434. While shown as a separate device, in some embodiments the nozzle 426a may be integrated with the source 426.

Figure 6:
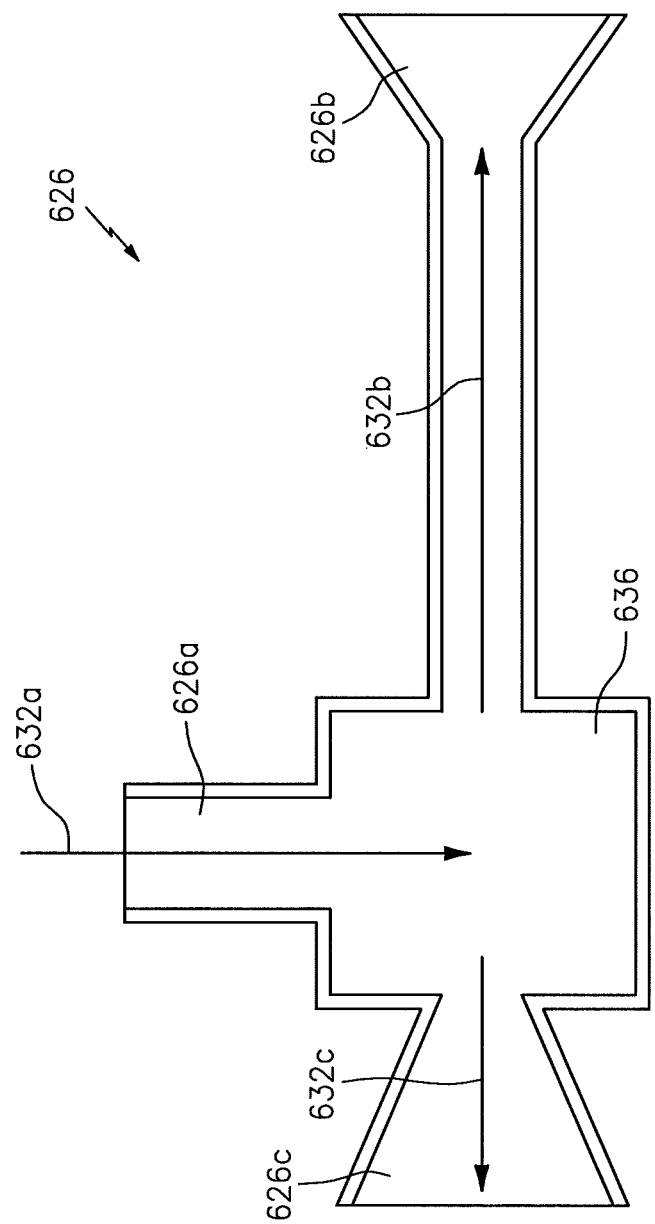
FIG. 6 illustrates a vortex tube in accordance with aspects of this disclosure.

The nozzle 426a may include a vortex tube (also known in the art as a Ranque-Hilsch vortex tube), such as the vortex tube 626 of FIG. 6. The vortex tube 626 may include a fluid input port 626a and one or more fluid output ports, such as for example output ports 626b and 626c.

The port 626a may be fluidly coupled to the source 426. Fluid 632a received from the source 426 by the port 626a may be provided to a chamber 636. The fluid in the chamber 636 may be accelerated/subject to rotation, such that the fluid may be separated into a fluid stream 632b and a fluid stream 632c. The fluid streams 632b and 632c may be at different temperatures relative to each other, and potentially relative to the fluid 632a entering the port 626a. For example, the temperature of the fluid 632c may be less than the temperature of the fluid 632a, and the temperature of the fluid 632a may be less than the temperature of the fluid 632b. In this example, the port 626c may be coupled (e.g., fluidly coupled) to the input port 434 of the plate 320 (see FIGS. 3-4) in order to provide cooled/chilled fluid to the plate 320. The cooled/chilled fluid provided to (and received by) the plate 320 may further enhance the cooling that is provided by the plate 320 to the component stack.

Figure 5:
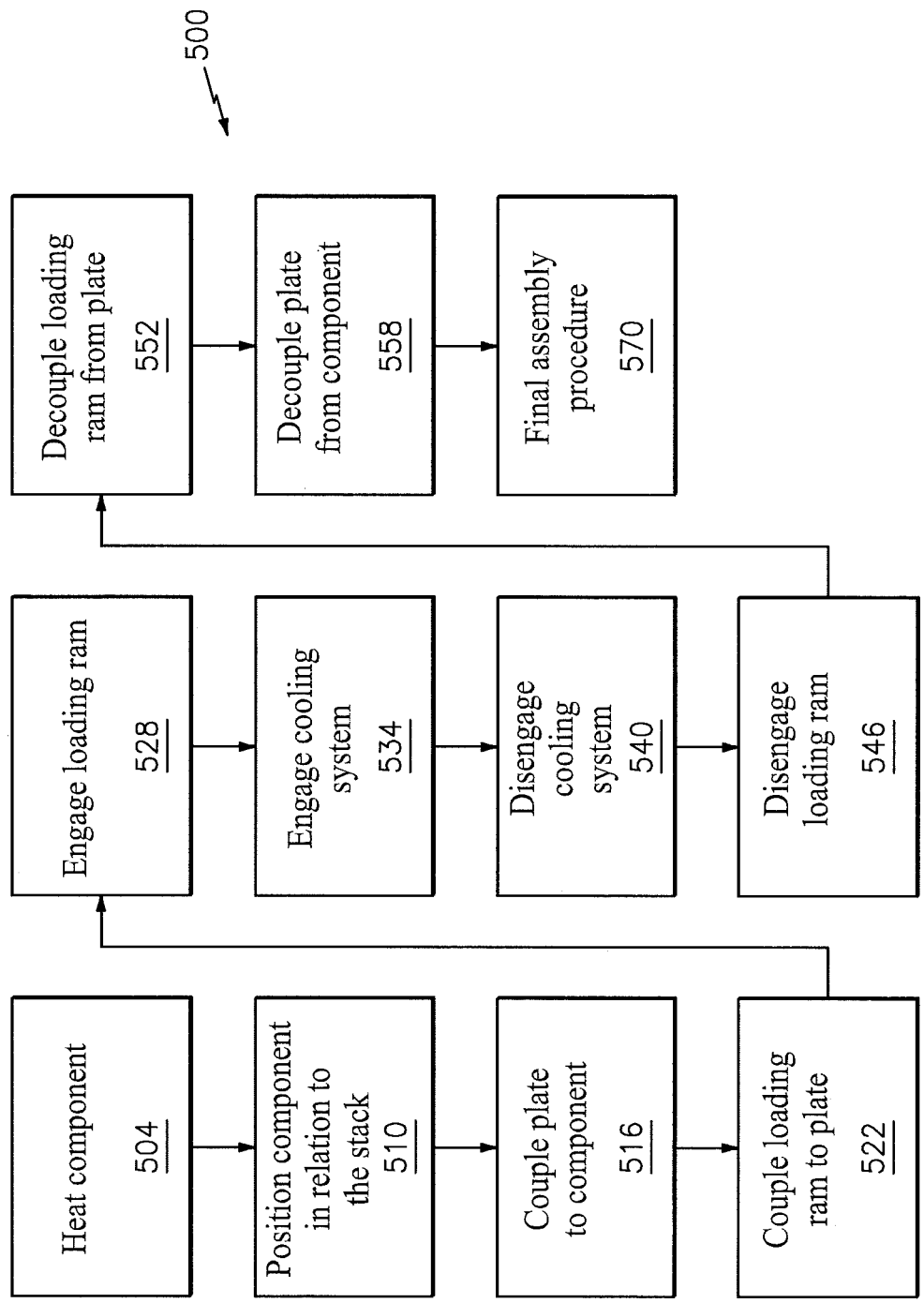
FIG. 5 illustrates a method for assembling a component stack in accordance with aspects of this disclosure.

Referring to FIG. 5, a flow chart of an exemplary method 500 is shown. The method 500 may be used to assemble one or more components. For example, the method 500 may be used to assemble a stack of components. For convenience, the method 500 is described below in relation to the system 300 of FIG. 3 (and the placement of the bearing 212b in the stack of FIG. 3 in particular). One skilled in the art will appreciate that the method 500 may be adapted to accommodate/conform to other systems, stacks, and/or components.

In block 504, the second bearing 212b may be heated. For example, as part of block 504, the bearing 212b may be placed in an oven/furnace or subjected to an induction heater. The particular temperature that the bearing 212b may be heated to may be based on one or more application requirements/specifications. In some embodiments, the temperature or time that the heat is applied to the component may be based on a material that the bearing 212b is formed from. In some embodiments, the bearing 212b may be heated to a temperature within a range of 149 degrees Celsius to 205 degrees Celsius; other temperature values may be used.

In block 510, the bearing 212b may be placed into position relative to the stack. As part of block 510, the bearing 212b (e.g., the race 214b) may be coupled to (e.g., abut) the shaft 224 and/or may be coupled to (e.g., abut) the spacer 218 on a first surface 212b-1 of the bearing 212b (e.g., the race 214b).

In block 516, the plate 320 may be coupled to the bearing 212b. As part of block 516, a second surface 212b-2 of the bearing 212b (e.g., the race 214b) may be coupled to (e.g., abut) a first surface 320-1 of the plate 320. The surface 212b-2 may be opposed to the surface 212b-1.

In block 522, the loading ram 240 may be coupled to (e.g., abut) the plate 320. As part of block 522, the loading ram 240 may abut a second surface 320-2 of the plate 320. The surface 320-2 may be opposed to the surface 320-1.

In block 528, the loading ram 240 may be engaged. Engaging the loading ram 240 may cause the loading ram 240 to apply a force/load to the stack. The particular load that is used may be based on parameters associated with an engine that the components of the stack pertain to. For example, the load may be based on materials used for the components, a dimension of one or more of the components, etc. In some embodiments, the loading ram 240 may apply a load within a range of 10,000 pounds and 50,000 pounds; other values for the load applied by the loading ram 240 may be used.

In block 534, a cooling system (e.g., the cooling system 400 of FIG. 4, including the plate 320 of block 516 described above) may be engaged. Engagement of the cooling system may include, e.g., transmission and/or receipt of fluid by one or more components, a circulation of cooling fluid in the cooling system, etc., in the manner described above. As part of block 534, a cooling fluid may be applied directly to the bearing 212*b* (if permitted as part of the particular application context).

Following a lapse of time during which the cooling system is engaged in block 534, the cooling system may be disengaged in block 540. The time may be specified based on a threshold temperature that the bearing 212*b* must cool to. The threshold temperature may be approximately equal to room/ambient temperature in some embodiments. In some embodiments, the threshold temperature may be approximately equal to a temperature of another component, such as for example a temperature of the shaft 224. In some embodiments, one or more temperature sensors (not shown) may be included to determine/measure one or more temperatures as part of block 540.

In block 546, the loading ram 240 may be disengaged. Disengaging the loading ram 240 may cause the loading ram 240 to cease applying a force to the stack.

In block 552, the loading ram 240 may be decoupled from the plate 320.

In block 558, the plate 320 may be decoupled from, e.g., the bearing 212*b*.

Portions of the method 500 may be executed as part of an iterative loop to assemble each component of a stack. For example, the blocks 504-558 may be executed once for each component included in the stack. Once the stack is assembled, flow may proceed to block 570 wherein any final assembly procedures may be performed.

Block 570 may include coupling a nut to the stack via a(n automated) torque wrench to hold the components of the stack in their respective positions. Block 570 may include the performance of one or more tests to determine whether the stack adheres to one or more requirements/specifications.

The method 500 is illustrative. In some embodiments, one or more of the blocks (or a portion thereof) of the method may be optional. In some embodiments, the blocks may execute in an order or sequence that is different from what is shown in FIG. 5. In some embodiments, additional blocks not shown may be included. In some embodiments, one or more portions of a first block may be integrated with one or more portions of one or more other blocks.

Figure 7:
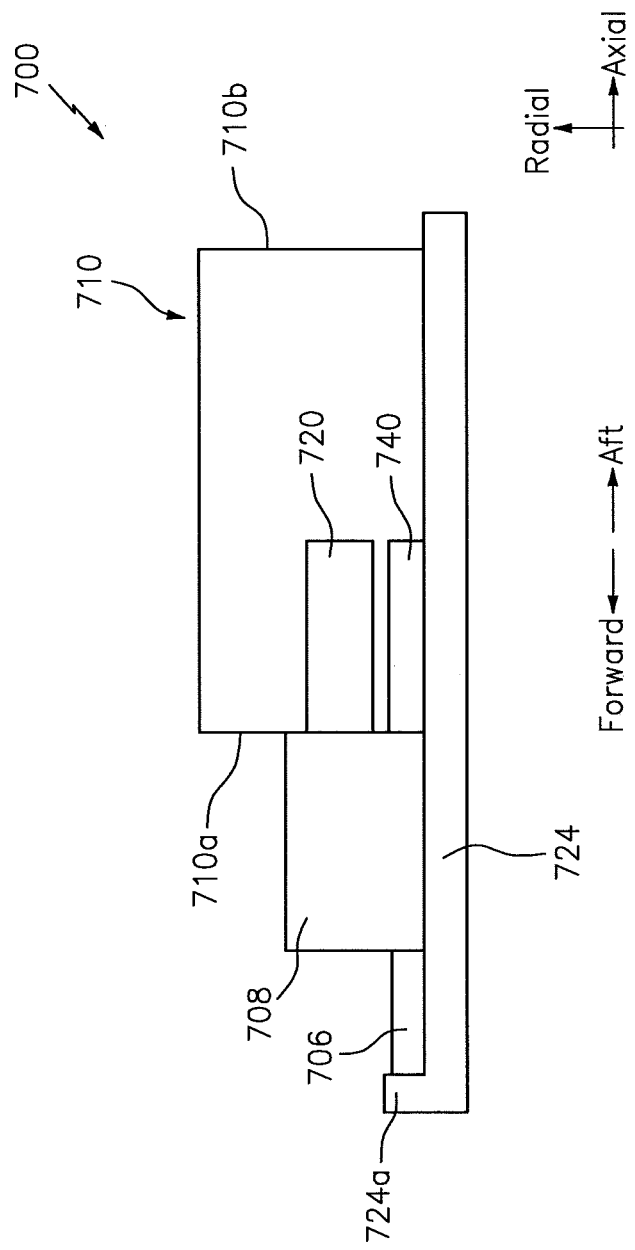
FIG. 7 illustrates a system incorporating a bearing stacking device in accordance with aspects of this disclosure.

Referring to FIG. 7, a system 700 for assembling components of an engine are shown. As shown, a first component 706 and a second component 708 may be assembled relative to one another as disposed on a shaft 724, where the shaft 724 may include a lip 724*a*. The components 706 and 708 may correspond to one or more of the components described above in relation to FIG. 3 (e.g., the components 706 and 708 may correspond to the seal 206, the bearings 212*a* and 212*b*, the spacer 218). The shaft 724 may correspond to the shaft 224.

The system 700 may include a bearing stacking device that includes a housing 710, a thermal transfer apparatus 720, and a loading ram 740. The housing 710 may include a first (e.g., forward facing) surface 710*a* and a second (e.g., aft facing) surface 710*b*. The housing 710 (e.g., the surface 710*a*) may abut the component 708. The housing 710 may surround the shaft 724. The housing 710 may contain a plurality of discontinuous exterior surfaces; for example, the surface 710*a* and the surface 710*b* may be configured for translational movement in relation to one another. Such an example of relative translational movement may occur during operation of the loading ram 740.

The thermal transfer apparatus 720 may (selectively) transfer thermal energy to/from the surface 710*a* and/or the component 708. For example, the thermal transfer apparatus 720 may transfer heat to the surface 710*a*. In some embodiments, the thermal transfer apparatus 720 may cool the surface 710*a*. The thermal transfer apparatus 720 may operate on the basis of one or more techniques, such as convection, radiation, conduction, etc. One or more fluids may be used in conjunction with the thermal transfer apparatus 720. The transfer of thermal energy to/from the surface 710*a* may control/regulate a temperature associated with, e.g., the component 708 and/or the shaft 724. In some embodiments, the thermal transfer apparatus 720 may be distinct from the surface 710*a*. In some embodiments, the thermal transfer apparatus 720 may be integrated with the surface 710*a*.

The loading ram 740 may correspond to the loading ram 240. The loading ram 740 may position the surface 710*a* in relation (e.g., axial relation) to the component 708.

Technical effects and benefits of this disclosure include an ability to quickly cool hardware during assembly. Such cooling may be obtained without necessarily using direct-air cooling that may have a tendency to introduce foreign objects/debris. Relative to conventional techniques, the cooling provided herewith may reduce the time it takes to assemble the hardware without sacrificing quality in the assembly (e.g., without introducing gaps between components in a stack).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A method for assembling components of an engine, comprising:
   positioning a first component adjacent to a second component such that a first surface of the first component abuts the second component;
   coupling a cooling plate to the first component such that a first surface of the cooling plate abuts a second surface of the first component;
   coupling a loading ram to the cooling plate such that a second surface of the cooling plate abuts the loading ram;
   heating the first component prior to positioning the first component adjacent to the second component;
   determining that a temperature of the first component is less than a threshold subsequent to coupling the cooling plate to the first component; and
   decoupling the cooling plate from the first component based on determining that the temperature of the first component is less than the threshold.

2. The method of claim 1, further comprising:
   engaging the loading ram subsequent to coupling the loading ram to the cooling plate.

3. The method of claim 2, further comprising:
engaging a cooling system subsequent to engaging the loading ram,
wherein the cooling system includes the cooling plate.

4. The method of claim 3, wherein the cooling system includes a fluid source coupled to the cooling plate, and wherein the cooling plate includes an input port, an output port, and a passage disposed between the input port and the output port, the method further comprising:
receiving, by the input port, a fluid from the fluid source; and
conveying, via the passage, the fluid from the input port to the output port.

5. The method of claim 4, wherein the fluid includes compressed air.

6. The method of claim 3, wherein the cooling system includes a fluid source and a nozzle, the method further comprising:
receiving, by the nozzle, a first fluid from the fluid source; and
transmitting, by the nozzle, a second fluid to the cooling plate.

7. The method of claim 6, wherein the nozzle includes a vortex tube with an input port and an output port, the method further comprising:
receiving, by the input port, the first fluid from the fluid source; and
transmitting, by the output port, the second fluid to the cooling plate.

8. The method of claim 6, wherein the first fluid has a first temperature and the second fluid has a second temperature that is less than the first temperature.

9. The method of claim 1, wherein the threshold is approximately equal to a temperature of a room where the first component is located.

10. The method of claim 1, further comprising:
disengaging a cooling system based on determining that the temperature of the first component is less than the threshold,
wherein the cooling system includes the cooling plate.

11. The method of claim 1, further comprising:
measuring the temperature of the first component to determine that the temperature of the first component is less than the threshold.

12. The method of claim 1, further comprising:
decoupling the loading ram from the cooling plate subsequent to coupling the loading ram to the cooling plate; and
decoupling the cooling plate from the first component subsequent to decoupling the loading ram from the cooling plate.

13. The method of claim 12, further comprising:
subsequent to decoupling the cooling plate from the first component, positioning a third component adjacent to the first component such that a first surface of the third component abuts the second surface of the first component;
subsequent to positioning the third component adjacent to the first component, coupling the cooling plate to the third component such that the first surface of the cooling plate abuts a second surface of the third component; and
subsequent to coupling the cooling plate to the third component, coupling the loading ram to the cooling plate such that the second surface of the cooling plate abuts the loading ram.

14. The method of claim 1, wherein the first component is a bearing that includes a roller and a race, the method further comprising:
abutting the race to a shaft of the engine,
wherein the second surface of the first component is a surface of the race.

15. The method of claim 1, wherein the second component is one of a seal, a spacer, or a shoulder of a shaft of the engine, and wherein the loading ram is hydraulically actuated.

16. The method of claim 1, further comprising:
subsequent to coupling the cooling plate to the first component, applying a cooling fluid directly to the first component.

* * * * *